(12) United States Patent
Conness et al.

(10) Patent No.: US 8,854,447 B2
(45) Date of Patent: Oct. 7, 2014

(54) SYSTEMS AND METHODS FOR AUTOMATICALLY ADJUSTING AUDIO BASED ON GAZE POINT

(71) Applicant: United Video Properties, Inc., Santa Clara, CA (US)

(72) Inventors: Jason W. Conness, Pasadena, CA (US); Phil Golyshko, Pacifica, CA (US); Thomas Woods, Arlington Heights, IL (US); Shrirang Nilkanth Jambhekar, Chino Hills, CA (US); Melvin Grefalda, San Francisco, CA (US); Richard Bullwinke, Palo Alto, CA (US); Minah Oh, Los Angeles, CA (US)

(73) Assignee: United Video Properties, Inc., Santa Clara, CA (US)

( * ) Notice: Subject to any disclaimer, the term of this patent is extended or adjusted under 35 U.S.C. 154(b) by 0 days.

(21) Appl. No.: 13/723,608

(22) Filed: Dec. 21, 2012

(65) Prior Publication Data

US 2014/0176813 A1    Jun. 26, 2014

(51) Int. Cl.
*H04N 7/18* (2006.01)
*H04N 5/60* (2006.01)
*G06F 3/01* (2006.01)
*G06K 9/00* (2006.01)

(52) U.S. Cl.
CPC .............. *H04N 5/60* (2013.01); *G06K 9/00597* (2013.01); *G06F 3/013* (2013.01)

USPC .............. 348/78; 348/738; 345/156; 345/158

(58) Field of Classification Search
CPC ........ G06F 3/013; G06F 9/00597; H04N 5/60
USPC .............................. 348/738, 78; 345/158, 156
See application file for complete search history.

(56) References Cited

U.S. PATENT DOCUMENTS

| 2012/0163625 | A1* | 6/2012 | Siotis et al. | 381/92 |
| 2012/0293406 | A1* | 11/2012 | Park et al. | 345/156 |
| 2013/0135196 | A1* | 5/2013 | Park et al. | 345/156 |

* cited by examiner

*Primary Examiner* — Jefferey Harold
*Assistant Examiner* — Omer Khalid
(74) *Attorney, Agent, or Firm* — Ropes & Gray LLP

(57) ABSTRACT

Embodiments provide methods and systems for adjusting audio output based on eye tracking input. In some embodiments, a memory stores data defining a boundary based on a coordinate system. The boundary corresponds to a display element of displayed content. An input receives data indicating coordinates of a gaze point location of a user viewing the displayed content. A processor compares the received coordinates of the gaze point location to the boundary corresponding to the display element to determine whether the gaze point location is inside the boundary corresponding to the display element. In response to determining that the gaze point location is inside the boundary corresponding to the display element, the processor adjusts an audio setting of the displayed content.

18 Claims, 9 Drawing Sheets

SYSTEMS AND METHODS FOR AUTOMATICALLY ADJUSTING AUDIO BASED ON GAZE POINT

BACKGROUND

When a user views video content on a screen, the user will often focus on a particular part of the screen. Eye tracking devices can be used to determine the location of the user's gaze, called the user's "gaze point." This gaze point can be associated with a screen so that the part of the screen that the user is viewing can be identified. Thus, the user's gaze point may indicate a person or item on the screen that the user is particularly interested in or engaged by.

Current viewing equipment is not responsive to a user's gaze point when playing video content. In particular, current viewing equipment does not utilize the gaze point to adjust the visual and audio properties of the video content. Thus, a user of current viewing equipment does not have passive, dynamic control over which element of a scene he would like emphasized in presentation of video content.

SUMMARY

In order to create a user-specific viewing experience based on a user's interests, systems and methods are provided herein for automatically adjusting audio associated with a video based on a user's gaze point on the displayed video. This allows the user to focus on the audio of the scene element he is most interested in. To further customize the viewing experience, closed captioning and/or image settings may also or alternatively be adjusted based on the user's gaze point.

Herein, a memory stores data defining a boundary based on a coordinate system. The boundary corresponds to a display element of displayed content. An input receives data indicating coordinates of a gaze point location of a user viewing the displayed content. A processor compares the received coordinates of the gaze point location to the boundary corresponding to the display element to determine whether the gaze point location is inside the boundary corresponding to the display element. In response to determining that the gaze point location is inside the boundary corresponding to the display element, the processor adjusts an audio setting of the displayed content.

In some embodiments, adjusting the audio setting of the displayed content comprises selecting an audio track associated with the display element from a plurality of audio tracks associated with the content and adjusting the volume of the selected track. The processor may be further configured to adjust at least one additional audio track associated with the content. Adjusting the at least one additional audio track may involve decreasing the volume of the at least one additional audio track. In other embodiments, adjusting the audio setting of the displayed content comprises selecting an audio track to accompany the content from a plurality of audio tracks associated with the content.

Some embodiments include an eye tracker. The eye tracker may be configured to determine a gaze point of a user, determine coordinates of a location on the display that the gaze point corresponds to, and transmit data indicating the coordinates of the gaze point location on the display to the input.

In some embodiments, the processor simultaneously adjusts an image of the displayed content in response to determining that the gaze point location is inside the boundary corresponding to the gaze element. Adjusting the image may involve bringing the display element into focus, and bringing at least one other display element out of focus.

In some embodiments, the processor displays closed captioning in response to determining that the gaze point location is inside the boundary corresponding to the display element.

In some embodiments, the processor adjusts the audio setting associated with the content based on a duration of the user's gaze on the display element.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF EMBODIMENTS

Figure 1:
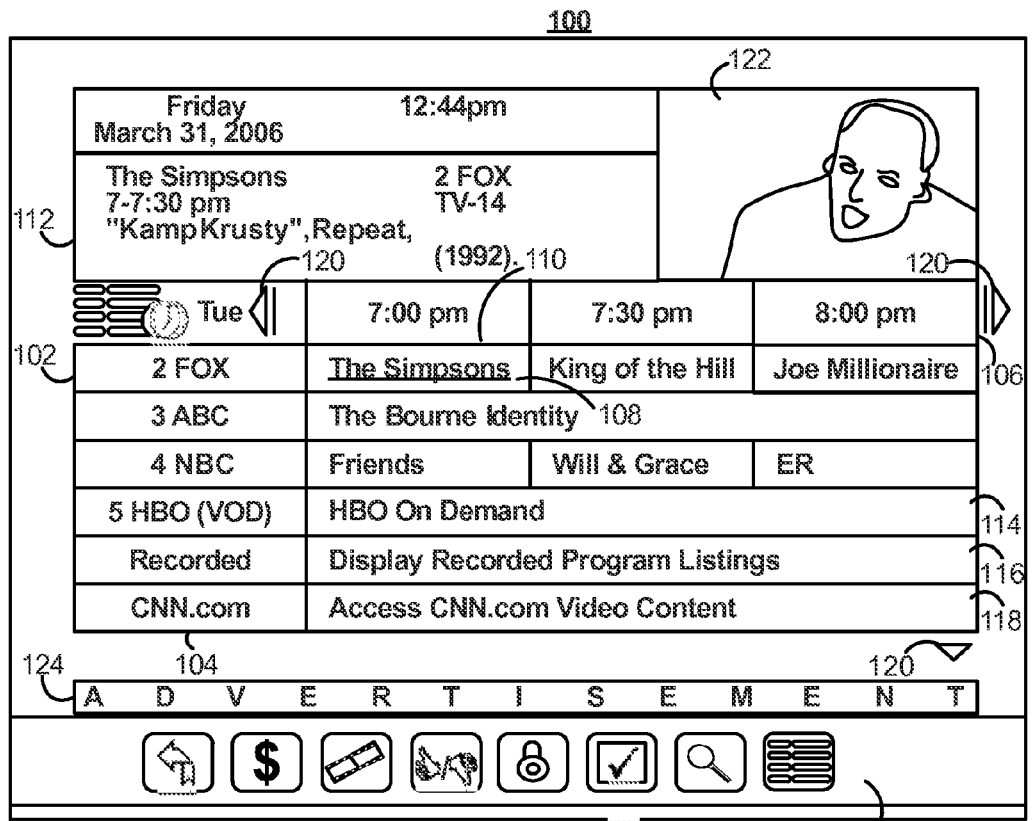
FIG. 1 shows an illustrative display screen that may be used to provide media guidance application listings and other media guidance information in accordance with an embodiment of the invention.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
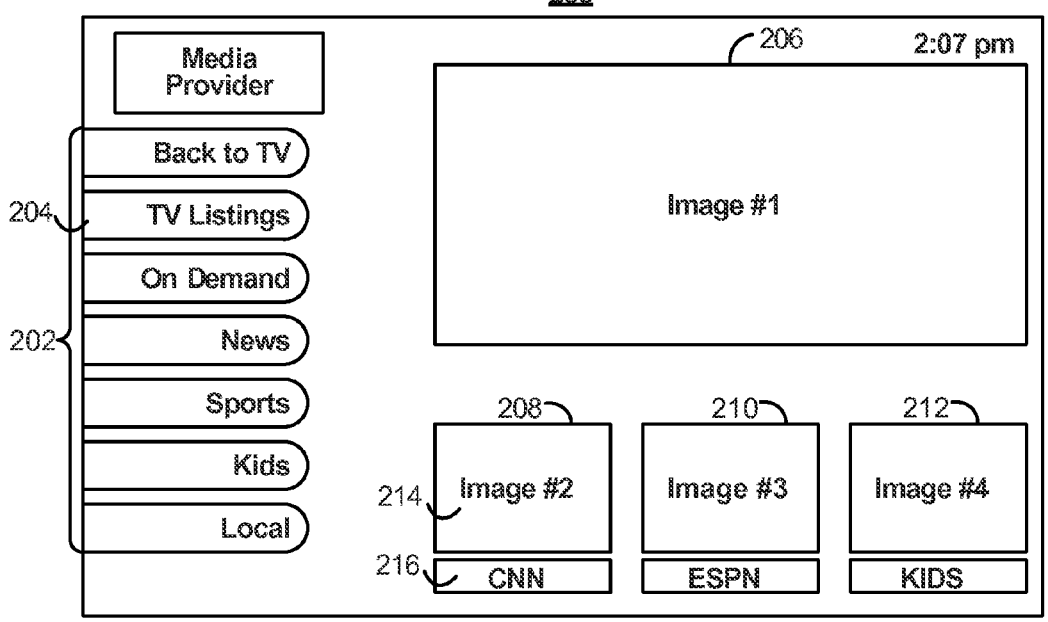
FIG. 2 shows another illustrative display screen that may be used to provide media guidance application listings in accordance with an embodiment of the invention.

FIGS. 1-2 show illustrative display screens that may be used to provide media guidance data. The display screens shown in FIGS. 1-2 and 6-14 may be implemented on any suitable user equipment device or platform. While the displays of FIGS. 1-2 and 6-14 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
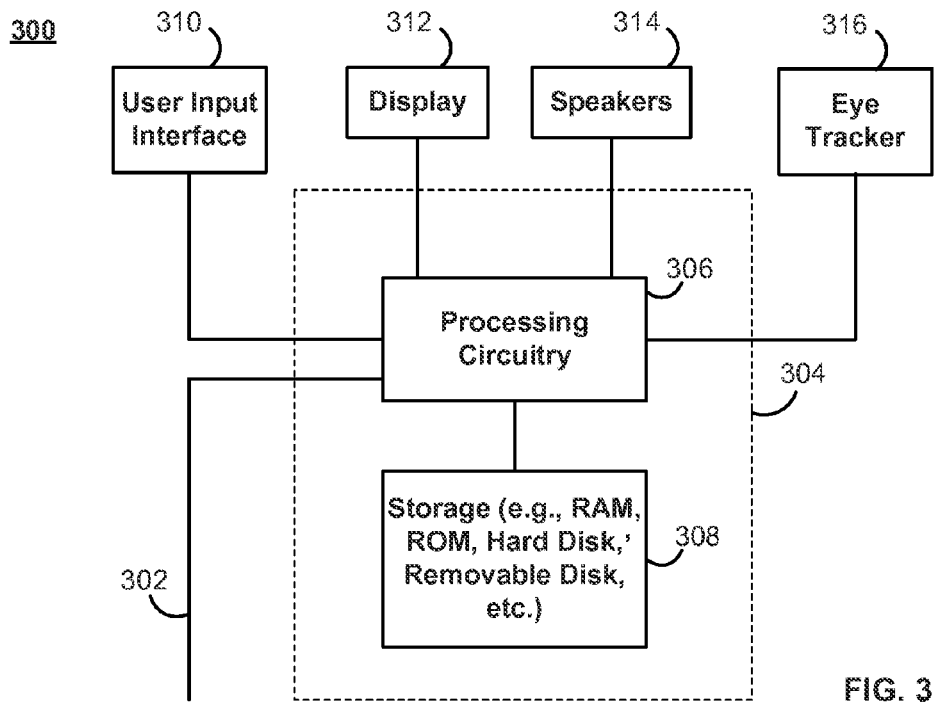
FIG. 3 is a block diagram of an illustrative user equipment device in accordance with an embodiment of the invention.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

User equipment device 300 may determine a location on which one or both of a user's eyes are focused using eye tracker 316. This location is referred to herein as the user's "gaze point." In particular, eye tracker 316 may monitor one of more eyes of one or more users of user equipment 300 to identify a gaze point on display 312 for each user. Eye tracker 316 may additionally or alternatively determine whether one or more eyes of one or more users are focused on display 312 or focused on a location that is not on display 312. In some embodiments, eye tracker 316 includes one or more sensors that transmit data to processing circuitry 306, which determines one or more users' gaze points. Eye tracker 316 may be provided as integrated with other elements of user equipment device 300 or may be a separate device or system in communication with user equipment device 300. Eye tracker 316 is described in further detail in relation to FIG. 5.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
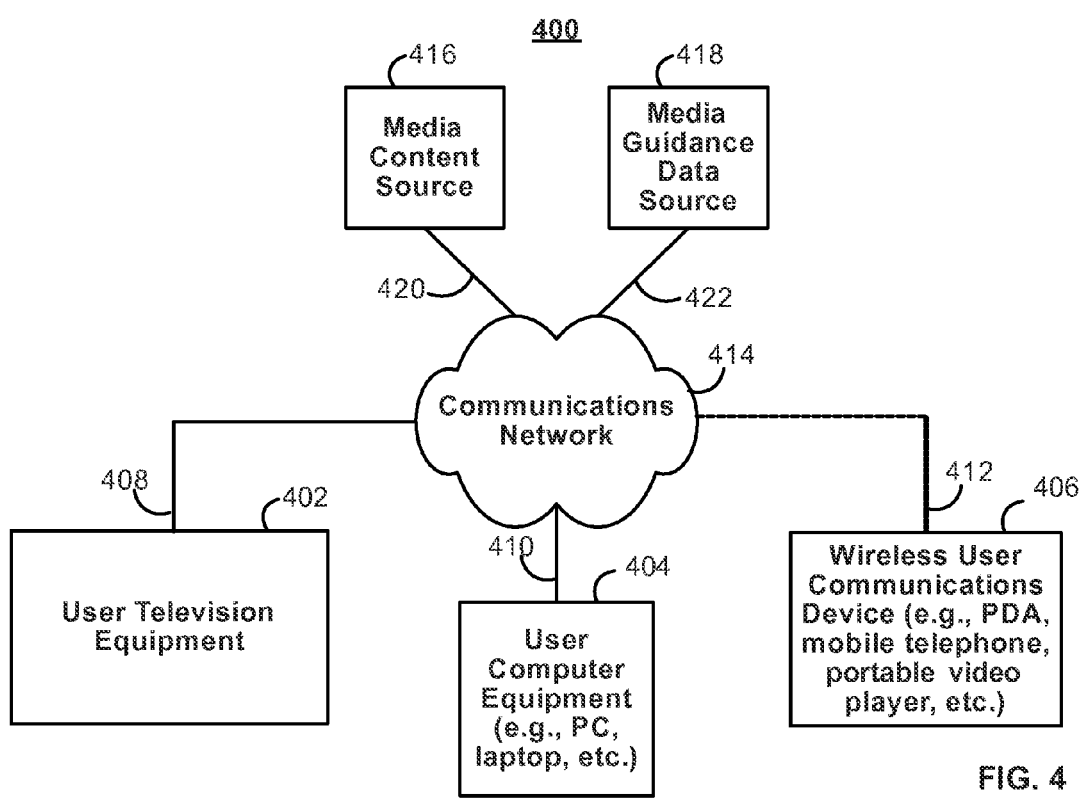
FIG. 4 is a block diagram of an illustrative interactive media system in accordance with an embodiment of the invention.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above.

Media guidance application data may be provided to the user equipment devices using any suitable approach. In some embodiments, the guidance application may be a stand-alone interactive television program guide that receives program guide data via a data feed (e.g., a continuous feed or trickle feed).

Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
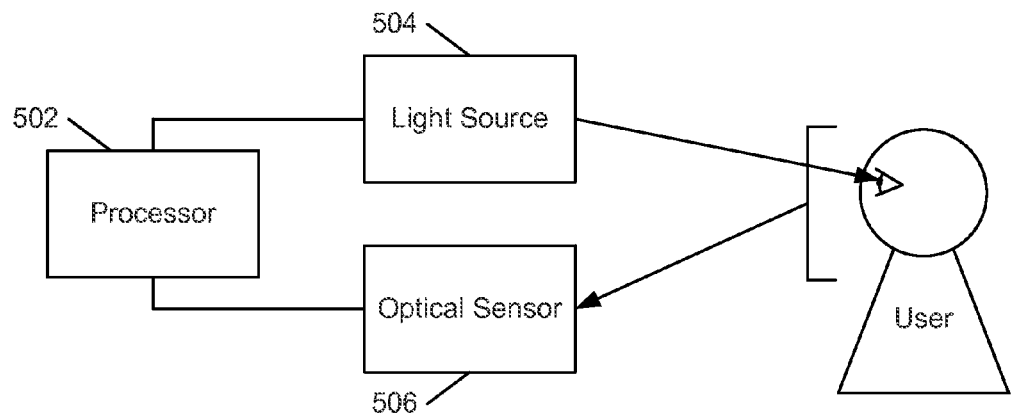
FIG. 5 is a block diagram of an eye tracker for identifying the gaze point of a user of user equipment in accordance with an embodiment of the invention.

FIG. 5 shows an embodiment of eye tracker 316 for identifying the gaze point of a user of user equipment 300. Eye tracker 316 includes processor 502, light source 504, and optical sensor 506. The light source 504 transmits light so that it reaches an eye of a user, and optical sensor 506 is directed at the user. Optical sensor 506 transmits collected data to processor 502, and based on the data received from optical sensor 506, processor 502 determines a user's gaze point.

In some embodiments, eye tracker 316 is configured for determining the gaze point of a single user. In other embodiments, eye tracker 316 may determine the gaze point of a plurality of users. Eye tracker 316 may identify multiple users in range, and a user of user equipment device 300 or eye tracker 316 may select one of the identified users to be tracked.

Processor 502 may be integrated with one or more light source 504 and one or more optical sensor 506 in a single device. Alternatively, one or more light sources 504 and optical sensors 506 may be housed separately from the processor 502 and in wireless or wired communication with processor 502. One or more of processor 502, light source 504, and optical sensor 506 may be integrated into user equipment device 300.

Processor 502 may be similar to processing circuitry 306 discussed above. In some embodiments, processing circuitry 306 may be processor 502, with processing circuitry 306 in communication with light source 504 and optical sensor 506. In other embodiments, processor 502 may be separate from but optionally in communication with processing circuitry 306.

Light source 504 transmits light to one or both eyes of one or more users. Light source 504 may emit, for example, infrared (IR) light, near infrared light, or visible light. The light emitted by light source 504 may be collimated or non-collimated. The light is reflected in a user's eye, forming, for example, the first Purkinje image (i.e., the reflection from the outer surface of the cornea), the second Purkinje image (i.e., the reflection from the inner surface of the cornea), the third Purkinje image (i.e., the reflection from the outer (anterior) surface of the lens), and/or the fourth Purkinje image (i.e., the reflection from the inner (posterior) surface of the lens).

Optical sensor 506 collects visual information, such as an image or series of images, of one or both of one or more users' eyes. Optical sensor 506 transmits the collected image(s) to processor 502, which processes the received image(s) to identify a glint (i.e., corneal reflection) and/or other reflection in one or both eyes of one or more users. Processor 502 may also determine the location of the center of the pupil of one or both eyes of one or more users. For each eye, processor 502 may compare the location of the pupil to the location of the glint and/or other reflection to estimate the gaze point.

Processor 502 may also store or obtain information describing the location of one or more light sources 504 and/or the location of one or more optical sensors 506 relative to display 312. Using this information, processor 502 may determine a user's gaze point on display 312, or processor 502 may determine whether or not a user's gaze point is on display 312.

In particular, processor 502 may identify locations on display 312 using a coordinate system, and processor 502 may identify an (x, y) coordinate representing the user's gaze point on display 312. For example, for a rectangular display, the lower left hand corner may be considered the origin and be assigned the coordinates (0, 0). Moving up display 312, the y-coordinate increases, and moving towards the right on the display, the x-coordinate increases. Any scale for the x and y axes may be used. Alternative coordinate systems may be used; for example, the center point of display 312 may be the origin, or any other corner of display 312 may be the origin. The locations of light sources 504 and/or sensors 506 may be identified using this coordinate system. The coordinate system may include a third dimension.

In some embodiments, eye tracker 316 performs best if the position of a user's head is fixed. In other embodiments, eye tracker 316 is configured to account for a user's head movement, which allows the user a more natural viewing experience than if the user's head were fixed in position.

In some embodiments, the system includes two or more optical sensors 506. For example, two cameras may be arranged to form a stereo vision system for obtaining a 3D eye position, which allows the processor to compensate for head movement. The two or more optical sensors 506 may be part of a single unit or may be separate units. For example, user equipment device 300 may include two cameras for eye tracking, or eye tracker 316 in communication with user equipment device 300 may include two cameras. In other embodiments, each of user equipment device 300 and eye tracker 316 may include a camera, and processor 502 receives image data from the camera of user equipment device 300 and the camera of eye tracker 316. Processor 502 may also receive data identifying the location of optical sensors 506 relative to display 312 and/or relative to each other and use this information when determining the gaze point.

In other embodiments, the system includes two or more light sources for generating multiple glints. For example, two light sources may create glints on different locations of the eye; having information on the two glints allows the processor to compensate for head movement. Processor 502 may also receive data identifying the location of light sources 504 relative to display 312 and/or relative to each other and use this information when determining the gaze point.

In some embodiments, other types of eye trackers that do not utilize a light source may be used. For example, optical sensor 506 and processor 502 may track other features of a user's eye, such as the retinal blood vessels or other features inside or on the surface of the user's eye, and follow these features as the eye rotates. Any other equipment or method for determining one or more users' gaze point(s) not discussed herein may be used in addition to or instead of the above-described embodiments of eye tracker 316.

Figure 6:
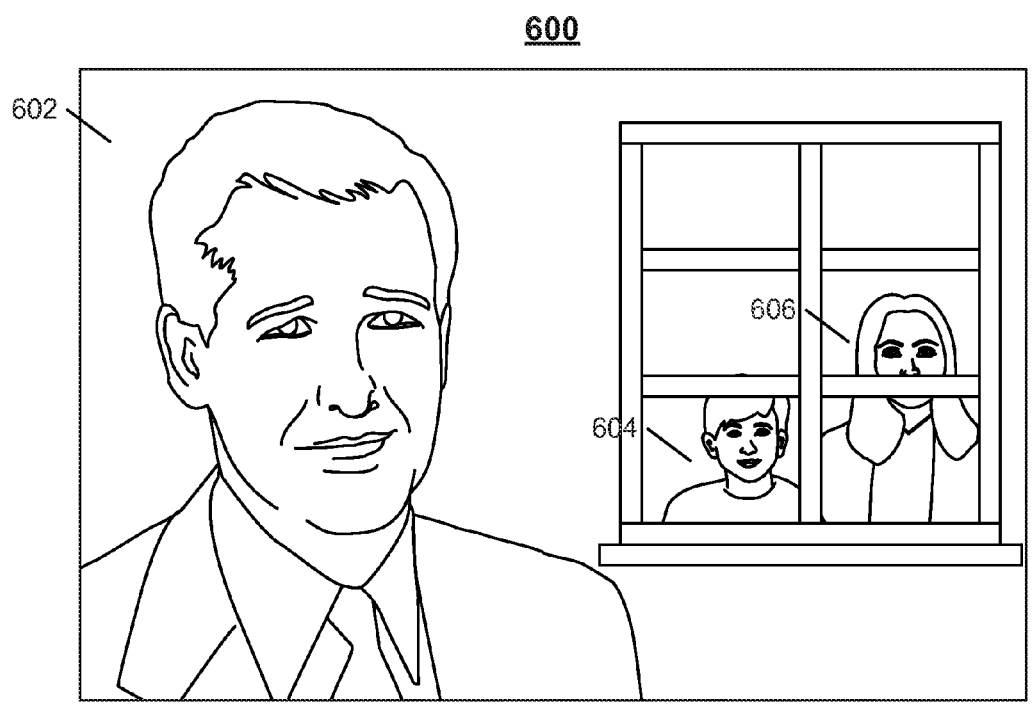
FIG. 6 shows an illustrative display screen displaying multiple display elements in accordance with an embodiment of the invention.

FIG. 6 shows an illustrative display screen 600 of a video with multiple display elements. As used herein, a "display element" is a component of a display screen, such as a person, a group of people, an animal, a building, or an inanimate object, that is displayed on a screen, such as display 312. The display screen may be an image in a video. A display screen may include multiple distinct display elements. Each display element may have an associated audio track. For example, a given image of video file may include multiple display elements, and, for each of the display elements, the video file may have an associated audio track. For example, if a video includes multiple people, the video file may have a separate audio track for each respective person's voice. Similarly, animals and objects (e.g., displayed music sources, vehicles, clocks, telephones, etc.) may have audio tracks.

The location, size, and/or shape of each display element may be defined using a coordinate system. Any of the coordinate systems corresponding to display 312 as discussed in relation to FIG. 5 may be used. For example, display elements can be enclosed by boundaries demarking the edge of the display elements; exemplary boundaries are discussed in relation to FIGS. 7-9. Data describing location, size, and/or shape of the display elements in multiple video images may be associated with video image data or display element data.

As an example, a data structure of display elements may include a record for each display element (e.g., each character). Each of these display element records may contain information identifying which video images the display element is visible in and, for each of these video images, where the display element is located in the image. The video images may be identified using, for example, frame number or time. Each display element record may also contain information identifying which video images the display element is audible in. A display element need not be visible to be audible. The display element record may include information identifying the name or location of the audio track associated with the display element.

As another example, a data structure may include a record for each video image. The video images may be identified using, for example, frame number or time. Each video image record may include information identifying which display elements are visible in the video image. Each video image record may also include information identifying which display elements are audible while that video image is displayed. A display element need not be visible to be audible. The video image record may include information identifying the name or location of the audio track associated with each display element. This may alternatively be stored separately, e.g., in a lookup table.

Multiple people or items may at times be considered a single display element. In general, if multiple sounds are related to one another (e.g., two people engaged in a single conversation, a radio playing music and a person singing along), the sources of the sounds may be considered part of a single display element and have a single audio track. If multiple sounds are not related to each other (e.g., two conversations between two sets of people, people walking on a sidewalk and unrelated traffic on the road next to the sidewalk), the sources of the sounds may be considered separate display elements. There may be one or more audio tracks that are not associated with any display elements, such as background music. In some embodiments, there may be one or more display elements that do not have associated audio tracks.

Individual audio tracks for a scene may have been recorded separately, e.g., at separate times, or with separate microphones. In this case, user equipment 300 may receive the video along with multiple audio tracks and data identifying which audio track is associated with which display element in the video. Alternatively, the audio signal for multiple display elements may have been recorded together, and this audio signal may be decomposed after recording into individual audio tracks for the separate display elements. The decomposition may be performed by user equipment 300, and user equipment 300 may also associate each decomposed audio track with a display element in the video. Alternatively, the audio signal may have been decomposed into individual audio tracks before the audio is received by user equipment 300; in this case, user equipment 300 may receive the video along with multiple audio tracks and data identifying which audio track is associated with which display element in the video.

Display screen 600 shows several exemplary display elements that may be displayed on display 312 of user equipment 300. Display screen 600 contains three figures: a man 602 in the foreground of display screen 600, a boy 604 outside a window and in the background of display screen 600, and a woman 606 next to the boy 604 and also in the background of display screen 600. The man 602 may be considered a separate display element from the boy 604 and/or the woman 606. The boy 604 may be considered a separate display element from the woman 606, or they may be considered a single display element.

For example, the man 602 may be speaking to the camera that recorded display screen 600 or may be engaged in conversation with someone not shown on the screen, while the boy 604 and woman 606 may be having a separate conversation. In this case, since the boy 604 and the woman 606 are engaged in a single conversation with each other, they may be considered a single display element. As used illustratively herein, the boy 604 and the woman 606 are the "right display element." Because the man 602 is engaged in a conversation that is separate from the conversation between the boy 604 and the woman 606, the man 602 may be considered a single display element that is separate from the right display element. As used illustratively herein, the man 602 is the "left display element."

The audio associated with a display element need not be confined to displayed audio sources. For example, if the man 602 is engaged in conversation with a person who is not displayed on display screen 600, the audio of the off-screen person may be part of the audio track associated with the man 602. As the video progresses, this off-screen person may be displayed and the man 602 may no longer be displayed; in this case, the same audio track containing the conversation between the man 602 and the off-screen person may become the audio track associated with the previously off-screen person (who is now displayed on the screen). Similarly, the boy 604 and the woman 606 are associated with a single audio track; if the boy 604 and the woman 606 walk towards the right so that only the boy 604 is visible through the window, the voice of the woman 606 may continue to be part of the audio track associated with the boy 604.

Figure 7:
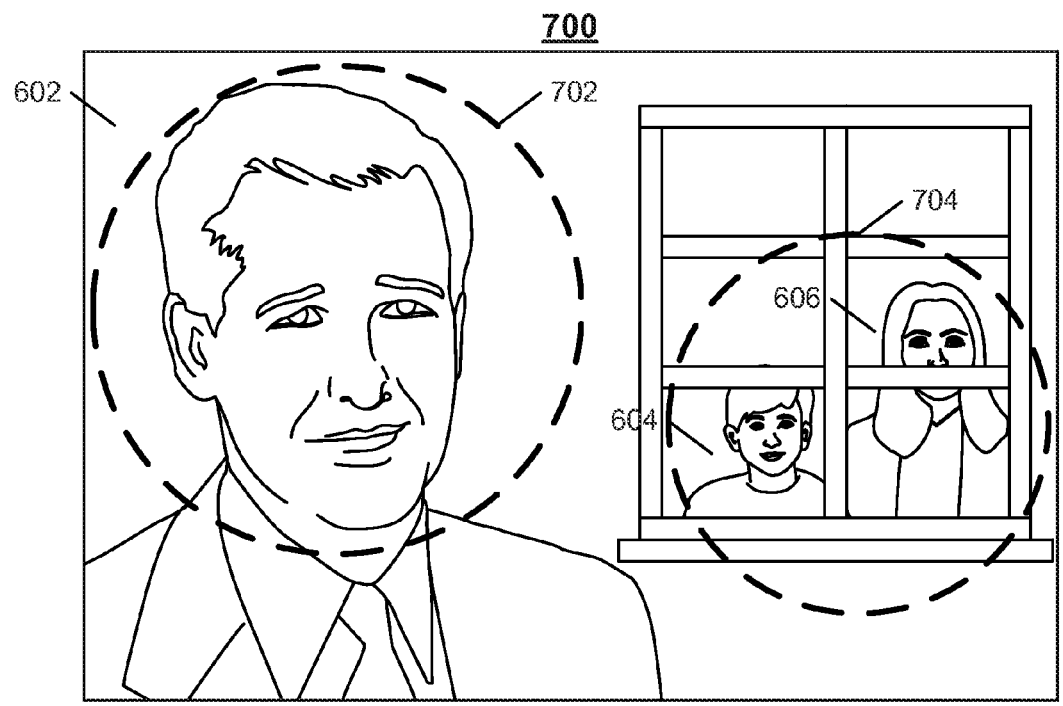
FIG. 7 shows the illustrative display screen of FIG. 6 with overlaid boundaries showing the areas of the display elements in accordance with an embodiment of the invention.

FIG. 7 shows illustrative display screen 700, which is display screen 600 with overlaid boundaries 702 and 704 showing the areas of the display elements. Boundary 702 shows the boundary for the man 602, i.e., the left display element, and boundary 704 shows the boundary for the display element formed by the boy 604 and the woman 606, i.e., the right display element. Boundaries may be any shape. Boundaries may or may not actually be displayed by display 312. Boundaries 702 and 704 may be generated by user equipment 300, or data identifying boundaries 702 and 704 may be received by user equipment 300.

Boundaries may be defined using the coordinate system discussed above. For example, boundary 702 may be defined by a center and a radius. The center is the (x, y) coordinate on the display, and the radius is the distance that each point boundary 702 is from the center. The boundary may be defined in alternate ways, such as the bottom point and the center. Alternatively, the coordinate of each point forming boundary 702 may be used to define the boundary. Boundary 704 may be defined similarly. Boundaries are stored by user equipment 300, and may be stored as part of the data structures described above in relation to FIG. 6.

As discussed above, eye tracker 316 may determine a location of a user's gaze (i.e., the user's gaze point) on display 312. Processing circuitry 306 receives data identifying the user's gaze point on display 312 (e.g., an (x, y) coordinate indicating the position of the gaze point on display 312) and compares the location of the gaze point on display 312 to boundaries 702 and 704 (which may be identified using the same coordinate system) to determine whether the gaze point is inside boundary 702, inside boundary 704, or outside both boundaries. If processing circuitry 306 determines that user's gaze point is inside boundary 702, processing circuitry 306 may adjust the audio to emphasize the audio from the left display element. For example, processing circuitry 306 may increase the volume of the audio track associated with the left display element. Processing circuitry 306 may additionally or alternatively decrease the volume of any other audio track (e.g., the audio track associated with the right display element) or mute any other audio track. Audio adjustments are discussed further in relation to FIGS. 10 and 11. In other embodiments discussed in relation to FIGS. 12 and 13, processing circuitry 306 may turn closed captioning on or off based on whether the user's gaze point is inside a boundary.

As a video on display 312 progresses, the size and/or locations of the boundaries 702 and 704 may change. For example, if the boy 604 and the woman 606 move further into the background, the circle enclosed by boundary 704 may shrink. As another example, if the man 602 moves to the right, boundary 702 may move to the right with him so that the circle enclosed by boundary 702 remains roughly centered on the face of the man 602. Different numbers of display elements in a video image may warrant more or fewer boundaries, each corresponding to one of the display elements.

Figure 8:
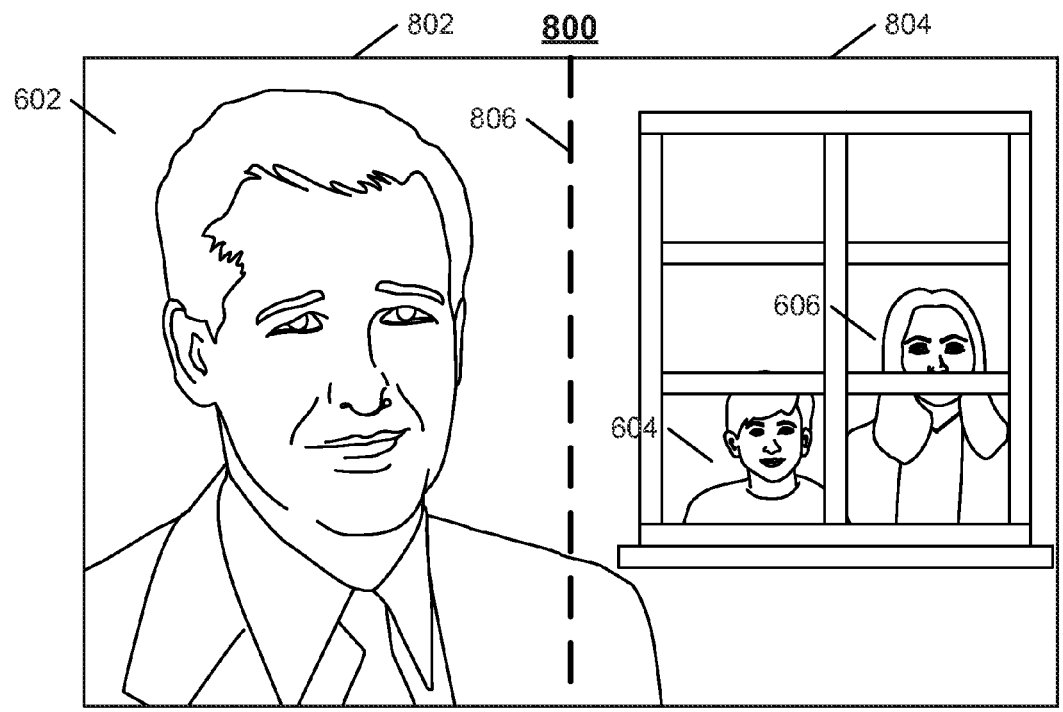
FIG. 8 shows the illustrative display screen of FIG. 6 with an overlaid line showing a boundary between the display elements in accordance with an embodiment of the invention.

FIG. 8 shows illustrative display screen 800, which is display screen 600 with an overlaid line 806 showing a boundary between display elements 802 and 804. Boundary 806 may be defined using the coordinate system. For example, a line may be defined by the coordinates of its endpoints. Alternatively, the coordinate of each point forming boundary 702 may be used to define the boundary.

Display element 802 corresponds to the left side of the display, which includes the man 602, and display element 804 corresponds to the right side of the display, which includes the boy 604 and the woman 606. Processing circuitry 306 receives data identifying the user's gaze point on display 312 and compares the location of the gaze point on display 312 to boundary 806 to determine whether the gaze point falls to the left side of boundary 806 (i.e., on left display element 802) or to the right side of boundary 806 (i.e., on right display element 804). For example, processing circuitry 306 may determine whether the x-coordinate of the gaze point is greater than or less than the x-coordinate of boundary 806. As discussed in relation to FIGS. 10-13, processing circuitry 306 may adjust audio and/or closed captioning based on the gaze point.

As a video on display 312 progresses, the location and/or position of boundary line 806 may change. For example, if the boy 604 and the woman 606 move further to the right, the boundary line 806 may move from the center of the screen towards the right. The boundary line 806 need not be a vertical line, but may be diagonal or horizontal. Different configurations of display elements may warrant one or more additional boundary lines, such two vertical boundary lines dividing display 312 into three areas, or one vertical boundary line and one horizontal boundary line intersecting to divide display 312 into quadrants. Boundary line 806 may or may not be displayed on display 312.

Figure 9:
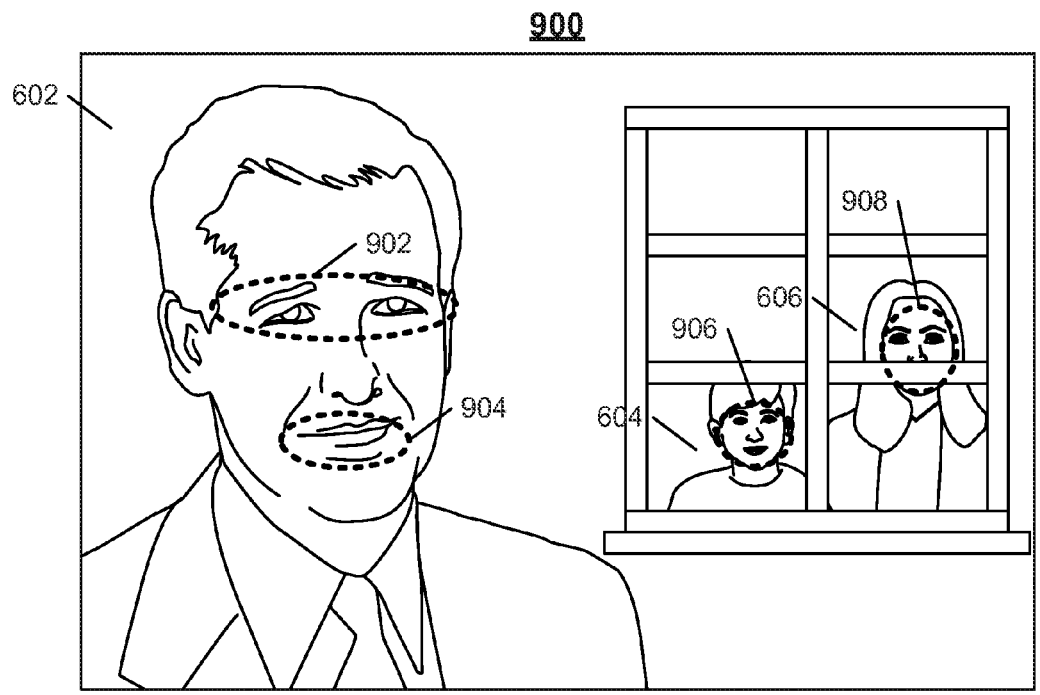
FIG. 9 shows the illustrative display screen of FIG. 6 with overlaid boundaries showing focus areas of the display elements in accordance with an embodiment of the invention.

FIG. 9 shows illustrative display screen 900, which is display screen 600 with overlaid boundaries 902, 904, 906, and 908 showing focus areas of the display elements. Boundaries 902-908 may be defined using the coordinate system discussed above, using, for example, the geometries of the shapes of boundaries 902-908, the coordinates of each point forming boundaries 902-908.

Boundaries 902 and 904 enclose focus areas of the man 602, namely his eyes and mouth, which a user may focus on when watching and listening to the man 602. Boundaries 906 and 908 enclose focus areas (in this case faces) of the boy 604 and woman 606, respectively. Processing circuitry 306 receives data identifying the user's gaze point on display 312 and compares the location of the gaze point on display 312 to boundaries 902-908 to determine whether the gaze point is inside any of the boundaries 902-908. As with boundaries 702 and 704, boundaries 902-908 may move with the features they are enclosing as the video progresses.

Processing circuitry 306 may utilize multiple types of boundaries for deciding whether and how to adjust audio and visual settings. For example, processing circuitry 306 can use the boundaries of FIG. 7 or 8 for identifying a general interest and the boundaries of FIG. 9 for identifying a more focused interest. In particular, processing circuitry 306 may determine which display element the user is generally paying attention to by comparing the gaze point location to the larger display element boundaries 702 and 704 from FIG. 7 and/or using boundary line 806 from FIG. 8. Processing circuitry 306 may additionally determine whether the user has a more focused interest in a particular display element by comparing the gaze point location to focus area boundaries 902-908.

In addition to the gaze location, processing circuitry 306 may also record the gaze duration or gaze frequency within a certain area of the screen. The longer a user is focused on a particular display element or focus area of a display element, the more interested the user may be in that display element. The user's gaze duration may be compared to one or more gaze duration thresholds to determine whether the user's gaze duration has reached a duration that triggers audio and/or visual adjustments. For example, processing circuitry 306 may compare gaze duration to an audio threshold to determine whether to adjust audio and a closed captioning threshold to determine whether to turn on closed captioning.

Similarly, the more times a user's gaze point is determined to be on a particular display element or focus area, the more interested the user may be in that display element. On the other hand, if the user's gaze point is moving around the display such that the user is not focusing on any particular display element or focus region for an extended duration, the user may not exhibit a particular interest in any display element. Gaze count thresholds that are similar to the gaze duration thresholds discussed above may be used. When comparing a gaze count to gaze count thresholds, processing circuitry 306 may look at recorded gaze points within a certain time period, e.g., the preceding second or preceding several seconds, to determine the user's interest.

Several exemplary viewing patterns will now be described. In a first example, if a user's gaze point is determined to be consistently within the left display element bounded by boundary 702 (or to the left of 806), the user exhibits an interest in the left display element. In a second example, if the user's gaze point is focused within the boundary 902 enclosing the eyes of the man 602, within the boundary 904 enclosing the mouth of the man 602, or is moving back and forth between the area within boundary 902 and the area within boundary 904, the user exhibits a strong interest in the man 902, and likely has a strong interest in what the man is saying.

In a third example, if a user's gaze point is determined to be mainly within the left display element bounded by boundary 702 but with some gaze points detected outside the boundary 702, and the gaze point within the boundary 702 is at times outside the focus areas 902 and 904 (e.g., on the man's hair, ear, shoulder, and/or tie), the user may exhibit a moderate interest in the man 602, but not as strong an interest as in the second example. In a fourth example, if a user's gaze point is determined to move back and forth between different display elements, e.g., moving between the area within boundary 702 and 704, or moving back and forth over boundary line 806, with minimal gaze points within focus areas boundaries 902-908, the user may exhibit a general interest in the display screen with no particular interest in any display element.

Audio and/or video settings (including closed captioning) may be adjusted based on the level of interest exhibited by the user. In particular, more drastic changes (e.g., muting audio tracks for display elements that the user is not focused on) may only be triggered by strong interest, while less drastic changes (e.g., minor volume adjustments based on the display element of interest) may be triggered by moderate interest. Adjusting of settings is discussed in further detail in relation to FIGS. 10-13.

In some embodiments, multiple users may watch a video simultaneously, and multiple users' eyes may be tracked. If all of the users are always focusing on the same display element, then the decision to adjust settings may be the same as with a single viewer. However, it is unlikely that all users will have identical gaze points. To account for this, in some embodiments, audio and video settings may remain neutral if the users have gaze points on different display elements. In other embodiments, adjustments may be made based on a selected single viewer's gaze.

In other embodiments, the gaze points of each of the multiple users may be taken into account. For example, the audio adjustments may be averaged or weighted based on the gaze points. For example, if two viewers are focused on a first display element and a third viewer is focused on a second display element, both display elements may be emphasized, but the first display element may be emphasized twice as much (while any other display elements are deemphasized). Or, the first display element may be emphasized while the second element is deemphasized. In some embodiments, even if all users are taken into account, one or more selected users' preferences may be favored and given a higher weight, or one or more users' preferences may be disfavored and given a lower weight.

In some embodiments, processing circuitry 306 may determine whether different display elements being focused on are complementary or unrelated and decide whether to adjust audio and video settings according to this determination. For example, if two users are focused on two different characters participating in a single conversation, processing circuitry 306 may emphasize both characters' audio tracks, as this conversation seems to be of interest to both users. As another example, if a first user is focusing on a person speaking and two other users are focusing on a fire truck with a blaring siren, processing circuitry 306 may decide not to adjust the audio. Adjusting the audio in that case may make the siren louder with respect to the dialogue, and this may make the dialogue difficult to hear, potentially harming the viewing and listening experience for at least the first user.

Figure 10:
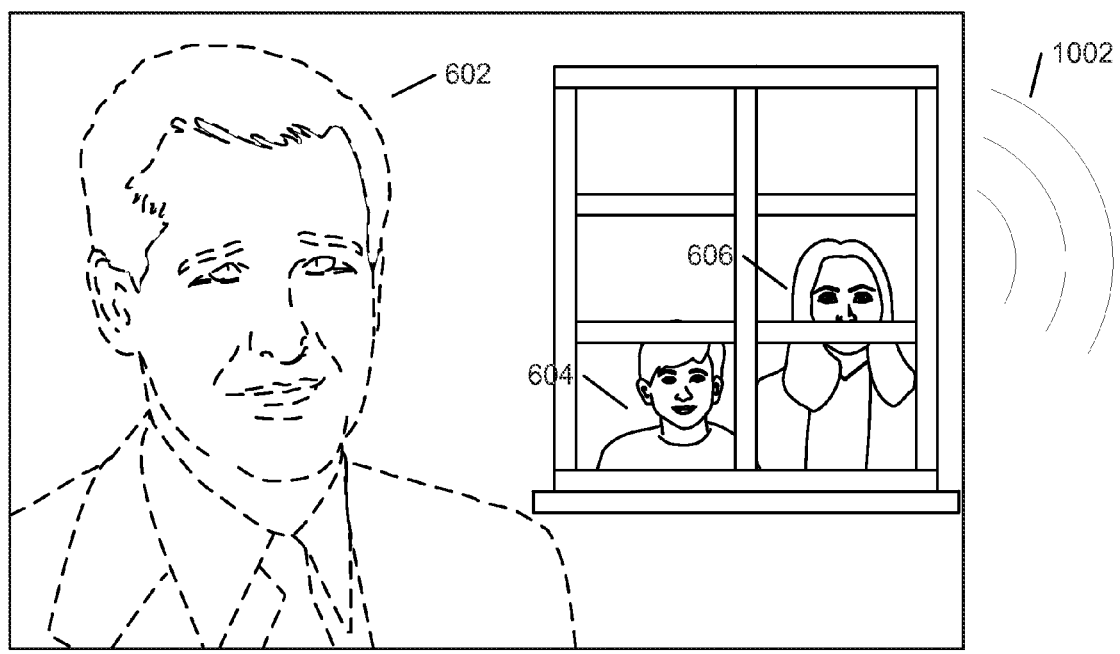
FIG. 10 shows the illustrative display screen of FIG. 6 along with an indication that the audio output is emphasizing the right display element in accordance with an embodiment of the invention.

FIG. 10 shows illustrative display screen 1000, which is display screen 600 with an indication 1002 that the audio output emphasizes the right display element. The audio focus on the right display element is illustrated by the sound illustration 1002 from the right display element and that the left display element is drawn in dashed lines. Neither of these illustrations need actually be displayed to the user; they are merely drawn to illustrate that an audio adjustment has occurred. However, in some embodiments, a visual indication that the audio has been adjusted may be displayed.

To focus the audio on the right display element, the volume of the audio track associated with the right display element may be increased, while the volume of the audio tracks for other display elements (in this case, the audio track associated with the left display element) may be decreased. In other embodiments, the volume of audio tracks other than the right display element may be muted. The video may have audio tracks that are not associated with any display elements, such as background noises or music. These audio tracks may be played as normal, increased in volume, decreased in volume, or muted. Settings for how to treat background noises and music and other audio tracks when adjusting audio track playback for a particular video may be received and accessed by processing circuitry 306.

In other embodiments, processing circuitry 300 may receive multiple audio tracks, each of which is preconfigured to emphasize a certain display element. In such embodiments, after identifying a display element to emphasize, processing circuitry 306 selects the audio track corresponding to that display element and outputs that audio track. This arrangement may involve less processing on the part of processing circuitry 306 because processing circuitry 306 would not adjust levels for audio tracks, output multiple audio tracks simultaneously, or combine multiple audio tracks.

In some embodiments, the user may display an interest in multiple display elements. For example, in a display screen with three display elements, the user may focus on two display elements and largely ignore the third. In this case, the audio may be adjusted to emphasize the audio tracks associated with the first two display elements and deemphasize the audio track associated with third display element.

In some embodiments, in addition to adjusting audio settings, the video image may also be adjusted. For example, for display screen 1000, the image may be refocused to bring the left display element out of focus and bring the right display element into focus. This refocusing may produce a more natural viewing experience for the user, better replicating the way the user would perceive the live scene. To allow refocusing, the video may have been recorded using a light-field camera, such as a LYTRO camera.

In some embodiments, the adjustment of audio or visual settings may be triggered according to certain rules that may be set and/or learned by the user. The user may be able to set a focus duration after which a setting should be adjusted. For example, the user may specify that after a strongly focused gaze on a display element for a certain number of seconds, the audio should be adjusted to emphasize the display element that the user is focusing on. A strongly focused gaze may be identified by uninterrupted or nearly uninterrupted focus on a focus area or between multiple focus areas of a single display element. For example, in FIG. 10, processing circuitry 306 may have adjusted audio settings such that the audio focus is on the right display element of the boy 604 and the woman 606 after processing circuitry 306 detected that, for a predetermined time period, the user's gaze point was detected entirely or mostly within focus area boundaries 906 (the boy's face) and 908 (the woman's face), shown in FIG. 9.

Figure 11:
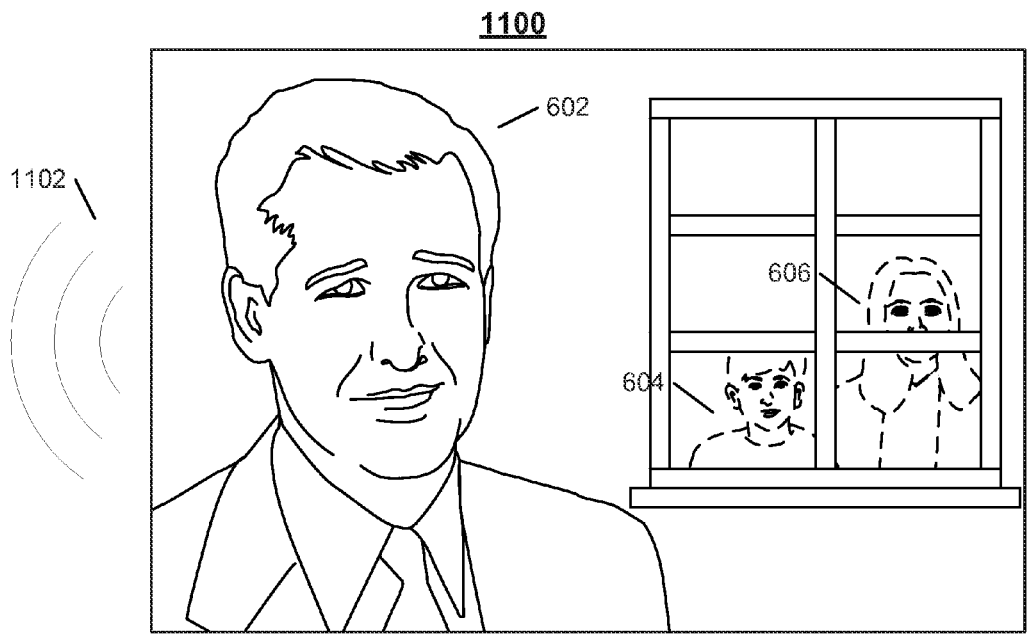
FIG. 11 shows the illustrative display screen of FIG. 6 along with an indication that the audio output is emphasizing the left display element in accordance with an embodiment of the invention.

FIG. 11 shows illustrative display screen 1100, which is display screen 600 with an indication 1102 that the audio output has shifted from emphasizing the right display element to now emphasize the left display element. The types of settings for emphasizing the left display element may be similar to the types of settings for emphasizing the right display element, discussed above in relation to FIG. 10.

After the right display element had been emphasized, as shown in FIG. 10, a change in the user's gaze or another user input, e.g., from user input 310, may cause the audio emphasis to revert to neutral audio settings or switch to audio settings to emphasize another display element, e.g., the left display element, as shown in FIG. 11. For example, if the user had previously been strongly focused on the right display element, creating the audio emphasis shown in FIG. 10, a shift in that focus to a neutral focus (e.g., the user's gaze point moving between different elements) may cause processing circuitry 306 to revert to neutral audio settings. Alternatively, the user may use user input 310 to request a return to neutral audio settings.

Alternatively, the audio settings may shift directly from the emphasis on the right display element to an emphasis on the left display element. This may be caused by a sudden shift in strong focus to the left display element, or an input received from user input 310 requesting a switch or cycling of display element to emphasize.

A user may be able to learn the type of behavior needed to adjust the audio with his eyes; this may help the user achieve an audio adjustment when desired, and prevent the user from inadvertently triggering an audio adjustment. The user may similarly be able to learn the type of behavior needed to revert the audio settings after adjusting them.

Figure 12:
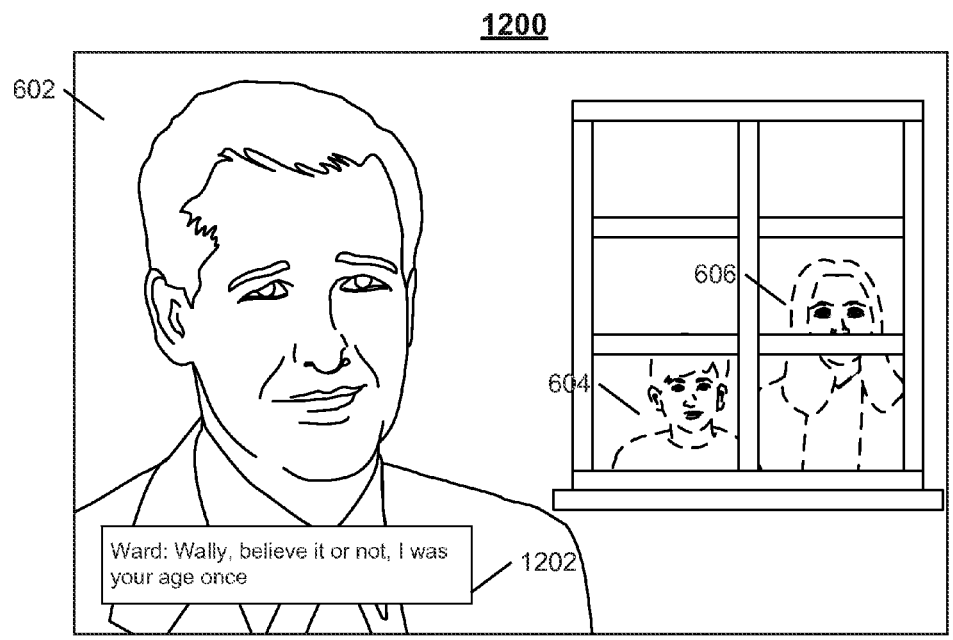
FIG. 12 shows the illustrative display screen of FIG. 6 with closed captioning displayed for the left display element in accordance with an embodiment of the invention.

FIG. 12 shows illustrative display screen 1200, which is display screen 600 along with closed captioning 1202 displayed for the left display element. The right display element is drawn with dashed lines, illustrating that closed captioning will not be displayed for this display element. The decision to display closed captioning for a display element may be similar to the decision to emphasize audio for a display element, described above in relation to FIG. 10. The level of focus of the user's gaze that triggers the display of closed captioning may be different from than the level of focus that triggers the adjustment of audio settings. In addition to adjusting closed captioning settings, the video image may also be adjusted, for example, by refocusing the image so that the left display element is in focus and the right display element is out of focus. Image refocusing is described above in relation to FIG. 10.

Figure 13:
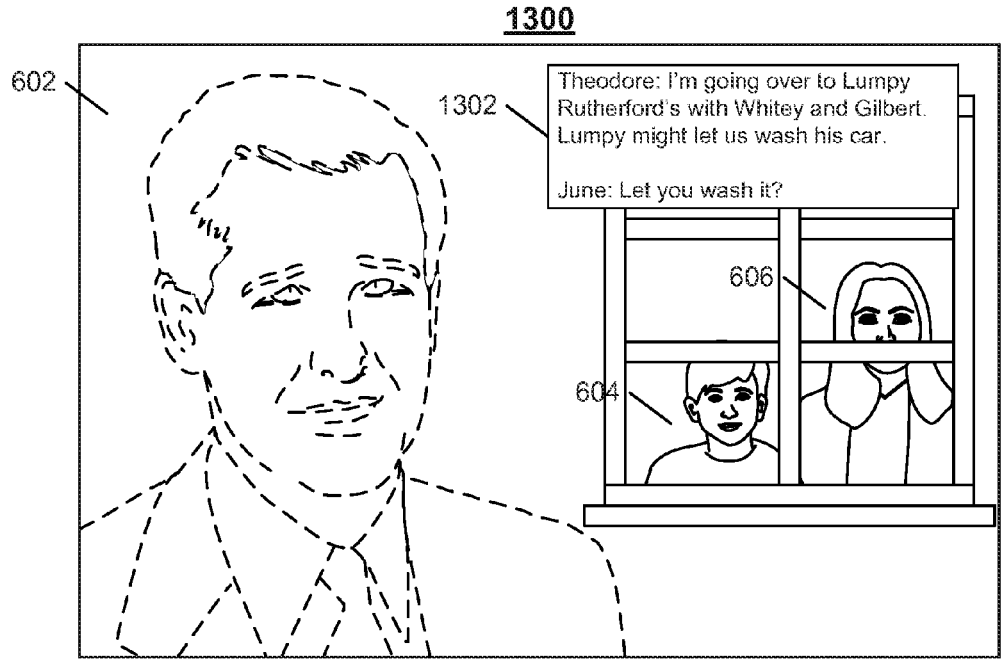
FIG. 13 shows the illustrative display screen of FIG. 6 with closed captioning displayed for the right display element in accordance with an embodiment of the invention.

FIG. 13 shows illustrative display screen 1300, which is display screen 600 along with closed captioning 1302 displayed for the right display element. The left display element is drawn with dashed lines, illustrating that closed captioning will not be displayed for this display element. The decision to switch closed captioning from one display element (e.g., the left display element as shown in FIG. 12) to another display element (e.g., the right display element shown in FIG. 13) may be similar to the decision to change audio focus to a different display element, as described above in relation to FIG. 11. The level of focus of the user's gaze that triggers the transition of closed captioning from one display element to a different display element may be different from than the level of focus that triggers a change of emphasis in audio settings. In some embodiments, closed captioning may be provided for the display element (e.g., the side of the screen) that the user is currently looking at, allowing the user to dynamically control the closed captioning with his eyes. In this case, a shift in gaze from the display element to the closed captioning for the display element should not cause the closed captioning to be removed, even though the user's gaze may have moved away from the display element.

In some embodiments, the closed captioning is treated as a display element having a boundary. The boundary of the closed captioning may be defined using the coordinate system discussed above. Processing circuitry 306 compares the location of the gaze point on display 312 to the boundary of closed captioning area 1302 to determine whether the gaze point is inside the boundaries of the closed captioning area 1302, and thus, whether or how much the user is reading the closed captioning. If processing circuitry 306 determines that the user is not looking at the closed captioning, or the user is not looking at it very frequently and/or for very short durations, processing circuitry 306 may automatically turn off closed captioning.

If a display element whose audio was being emphasized or who was being closed captioned exits the display 312, the audio and/or closed captioning settings may revert to neutral settings. Further, the audio and/or closed caption settings for that display element may be resumed when the display element reappears on the screen.

In some embodiments, user input 310 may be used in coordination with eye tracker 316 to control audio and video settings. For example, user input 310 may contain a control to signal to processing circuitry 306 that the user wishes settings be adjusted based on his gaze point. There may be separate controls for adjusting audio settings, adjusting closed captioning, and adjusting other visual settings. Alternatively, there may be a single control that the user has preconfigured with desired adjustments. Requiring a user input to adjust settings using user input 310 may prevent processing circuitry 306 from adjusting settings when the user does not want the settings adjusted. In some embodiments, some settings, such as image refocusing or minor audio adjustment, may be performed solely based on gaze, while other settings, such as turning on closed captioning or a major audio adjustment (e.g., muting one or more audio tracks) may require additional user input so that the user does not trigger these inadvertently.

If the user has indicated using user input 310 that he wants one or more settings adjusted based on gaze, gaze boundaries, such as focus area boundaries 902-908, may be displayed on display 312. These boundaries 902-908 indicate to the user where to focus to tell processing circuitry 306 to adjust settings.

In some embodiments, the user's interest level in a display element (as determined based on the user's gaze point) may be used to determine what content is displayed. For example, in FIG. 6, if the user is focused on the boy 604 and the woman 606, processing circuitry 306 may zoom in on these characters. If the boy 604 and the woman 606 are walking and move out of the window or off the screen, processing circuitry may select to display content that follows the boy 604 and the woman 606. On the other hand, if the user is focused on the man 602, processing circuitry 306 may continue displaying content involving the man 602 even if the boy 604 and the woman 606 walk out of the scene.

In some embodiments, a program has a default sequence that is displayed unless the user has demonstrated a given level of interest in an alternative sequence. For example, the program shown in FIG. 6 may, by default, progress to focus on the story of the man 602, but if the user has a strong focus on the boy 604 and the woman 606, processing circuitry may select content relating to the boy 604 and the woman 606. The default sequence may also be used if eye tracking is not enabled.

In other embodiments, there may be no preferred sequence, and the content is dynamically selected based on the user's interests as demonstrated by his gaze point. For example, during a given scene, processing circuitry 306 may monitor the user's gaze point and select a display element from the scene based on which display element the user has demonstrated the most interest based on, for example, number of gaze points detected within each display element and/or the gaze durations within each display element. Processing circuitry 306 may select the content to display next based on the selected display element. In some embodiments, the user may display an interest in multiple display elements, and the content may be selected based on multiple interests of the user. In other embodiments, if multiple users are watching the content simultaneously and each user's eyes are being tracked, the interests of the multiple users may be averaged or weighted to select the next content.

Figure 14:
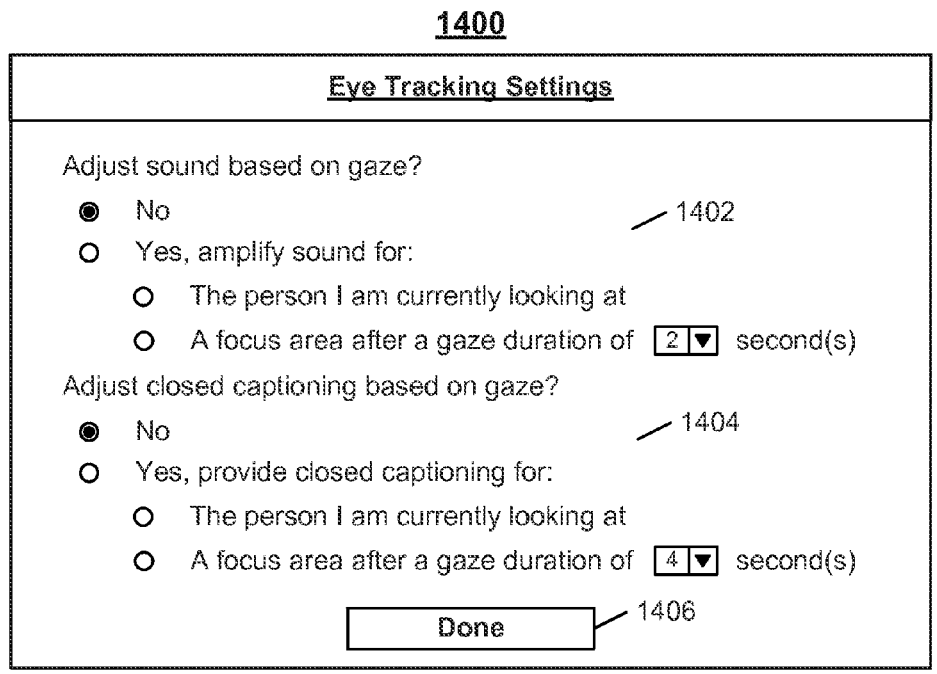
FIG. 14 shows an illustrative display screen for configuring eye tracking settings for adjusting audio and closed captioning based on a user's gaze in accordance with an embodiment of the invention.

FIG. 14 shows an illustrative display screen 1400 for configuring eye tracking settings. Display screen 1400 receives a user's instructions to processing circuitry 306 for when to adjust audio and closed captioning based on the user's gaze. Audio eye tracking settings 1402 in display screen 1400 allow a user to input whether to adjust sound settings based on the user's gaze, and, if so, when to adjust sound settings. Illustrative audio eye tracking settings 1402 allow the user to indicate that sound should be amplified for a person when the user is looking at the person, or to indicate that sound should be amplified after the user has focused on a focus area for a specified gaze duration. The gaze duration may be input by the user.

Closed captioning eye tracking settings 1404 in display screen 1400 allow a user to input whether to adjust closed captioning settings based on the user's gaze, and, if so, when to adjust closed captioning settings. Illustrative audio eye tracking settings 1404 allow the user to indicate that closed captioning should be provided for a person when the user is looking at a person, or to indicate that closed captioning should be provided after the user has focused on a focus area for a specified gaze duration. The gaze duration may be input by the user, and it may be different from the gaze duration in sound settings 1402.

Any other parameters for adjusting sound, image, or closed captioning, such as those described above in relation to FIGS. 6-13, may be selected by the user in this or additional setup screens. For example, the user may indicate how to adjust sound when he is focusing on a display element (e.g., rebalance the sound to emphasize a particular audio track, or mute one or more audio tracks), how long to keep closed captioning on, whether to display focus area boundaries, whether to refocus the image, etc. Alternatively, one or more of these settings may be transmitted in data accompanying content, and the user may or may not be permitted to change settings for the content. Alternatively, one or more of these settings may be preconfigured by user equipment 300, and the user may not be able to adjust them.

Figure 15:
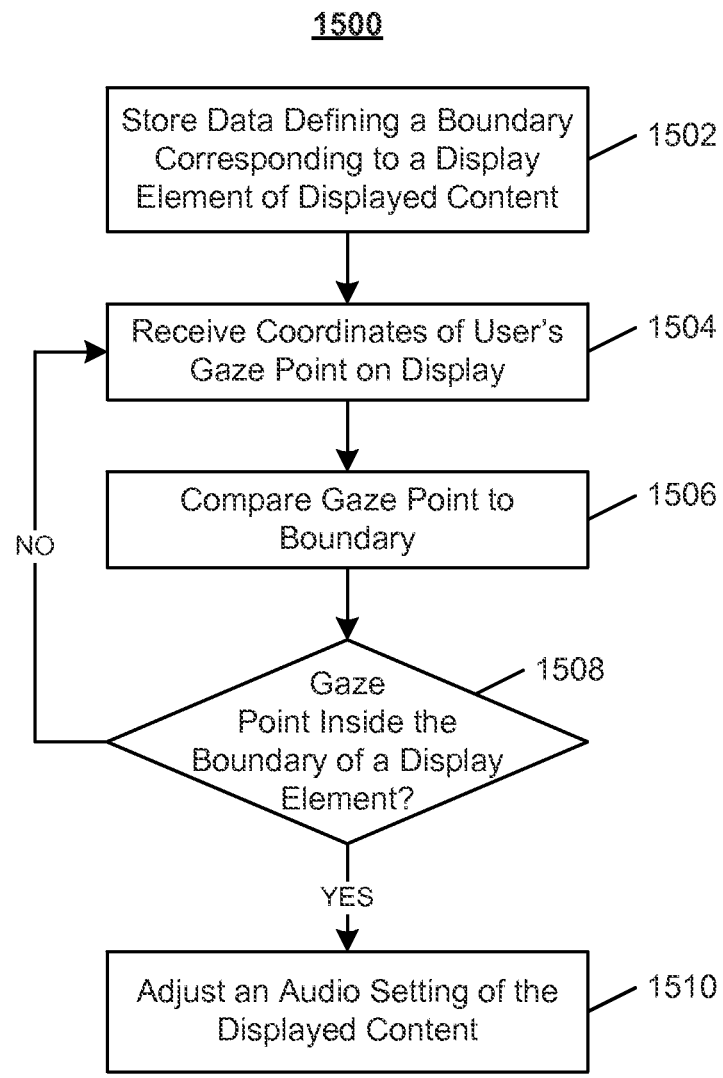
FIG. 15 shows an illustrative process for automatically adjusting an audio setting based on a user's gaze point on a display in accordance with an embodiment of the invention.

FIG. 15 shows an illustrative process for automatically adjusting an audio setting for content based on a user's gaze point on the display. First, processing circuitry 306 stores in a memory data defining a boundary corresponding to a display element of displayed content, e.g., content displayed on display 312 (step 1502). The boundary may be defined using a coordinate system, as discussed above in relation to FIGS. 5-9.

Processing circuitry 306 then receives data, such as (x, y) coordinates, identifying a user's gaze point location, which may have been determined by eye tracker 316 as described in relation to FIG. 5 (step 1504). The data identifying the user's gaze point may provide the gaze point on or in relation to display 312. In particular, (x, y) coordinates identifying the gaze point location may be in reference to the same coordinate system in which the boundary is defined. Alternatively, if the gaze point location is based on a different coordinate system from the coordinate system with which the boundaries are defined, either the gaze point location or the boundaries could be converted so that the gaze point location and the boundaries are on the same coordinate system.

Processing circuitry 306 then compares the coordinates of the gaze point location to the boundary of the display element (step 1506) to determine whether the gaze point location is inside of the boundary of the display element (decision 1508), as described in relation to FIGS. 7-9. If the gaze point location is not inside the boundary of the display element, processing circuitry 306 receives the next gaze point location (step 1504). In some cases, processing circuitry 306 may first compare the gaze point location to one or more additional display element boundaries.

If the gaze point location is inside the boundary of the display element, processing circuitry 306 adjusts an audio setting for the content (step 1510). As discussed in relation to FIGS. 10 and 11, processing circuitry 306 may adjust the volumes of the program's audio tracks to emphasize the audio track associated with the identified display element, or processing circuitry 306 may mute one or more audio tracks while the audio track associated with the identified display element is still audible.

Figure 16:
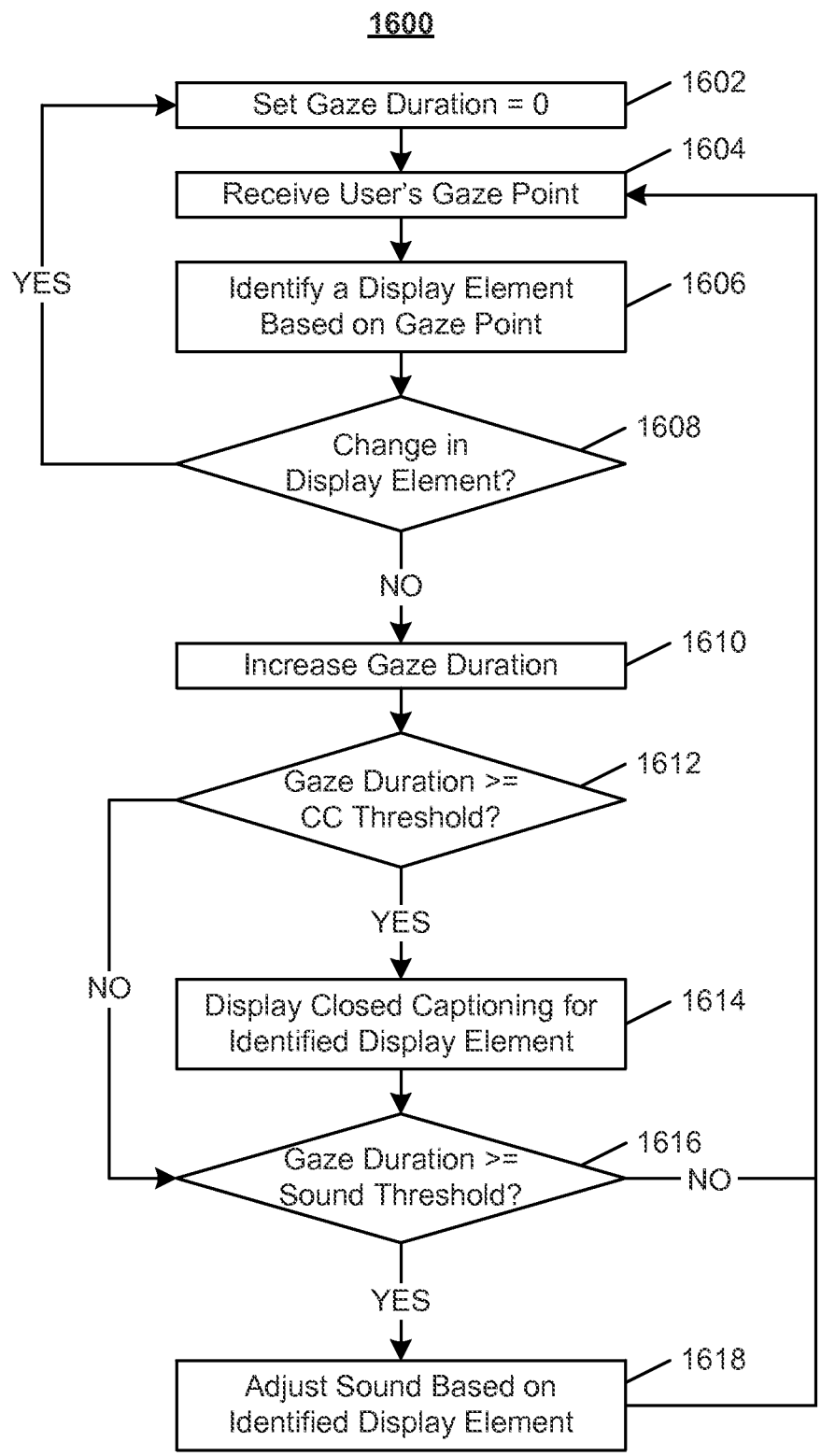
FIG. 16 shows an illustrative process for automatically adjusting sound and closed captioning based on a user's gaze point and gaze duration in accordance with an embodiment of the invention.

FIG. 16 shows an illustrative process for automatically adjusting sound and closed captioning based on a user's gaze point and gaze duration. In summary, processing circuitry 306 keeps track of a user's gaze duration, compares the duration to thresholds for adjusting closed captioning and audio settings, and adjusts the closed captioning or audio settings if the respective threshold has been met.

Processing circuitry 306 sets gaze duration, which is a variable for storing the amount of time that the user has looked at a particular display element, to 0 (step 1602). Processing circuitry 306 receives coordinates of a user's gaze point from eye tracker 316 (step 1604), and processing circuitry 306 compares the coordinates of the user's gaze point to one or more boundaries to identify a display element whose boundaries the coordinates of the gaze point is inside (step 1606).

Processing circuitry 306 then compares the identified display element to the display element of the previously received gaze point to determine whether there is a change in the display element, i.e., whether the user's eyes have shifted to a different display element (decision 1608). A shift in gaze from one focus area of a display element to another focus area of the same display element (e.g., a shift in gaze from a person's eyes to the same person's mouth, or a shift in gaze from one participant in a conversation to another participant in the same conversation) may or may not be considered a change in the display element. If processing circuitry 306 determines that there was a change in the display element the user is focusing on, processing circuitry 306 resets the gaze duration to 0 (step 1602). If processing circuitry 306 determines that there was no change in the display element the user is focusing on, processing circuitry 306 increases the gaze duration by the length of time between the time that the previous gaze point was obtained and the time that the second gaze point was obtained (step 1610).

Processing circuitry then compares the current gaze duration to a closed captioning threshold, which is the threshold gaze duration before closed captioning settings are adjusted (decision 1612). The closed captioning threshold may have been received from a user using, for example, eye tracking settings display screen 1400. Alternatively, a default closed captioning threshold for the content or user equipment 300 may be used. If the gaze duration equals or exceeds the closed captioning threshold, processing circuitry 306 displays display 312 closed captioning for the identified display element (step 1614).

Processing circuitry also compares the current gaze duration to a sound threshold, which is the threshold gaze duration before audio settings are adjusted (decision 1616). Decision 1616 can be performed after decision 1612, as shown, or these decisions (and subsequent adjustments, if needed) may be performed in parallel. As with the closed captioning threshold, the sound threshold may have been set by the user using, for example, eye tracking settings display 1400. Alternatively, a default sound threshold for the program or the user equipment 300 may be used. If the gaze duration equals or exceeds the sound threshold, processing circuitry 306 adjusts the sounds to emphasize the identified display element (step 1618). Processing circuitry 306 continues monitoring the user's gaze point and gaze duration to determine if closed captioning and/or audio settings should be adjusted.

In the above-described process, the gaze duration is consecutive; that is, if the user's gaze moves off the display element for even a moment, the gaze duration is reset. In other embodiments, the gaze duration need not be consecutive, but may be measured over a duration of time slightly longer than the threshold(s). For example, if the closed caption threshold is 3 seconds, and the user's gaze has been detected in a focus area of the display element three-quarters of the time in the last 4 seconds (i.e., for a total of three seconds), processing circuitry 306 may consider this gaze pattern to meet the closed caption threshold and display closed captioning for that display element. On the other hand, if the user's gaze has been detected in the focus area of the display element for one-third of the time in the last 9 seconds (i.e., for a total of three seconds), this may not be sufficient to meet the threshold, as the user has focused on that display element for less than half of the time.

It should be understood that the above steps of the flow diagrams of FIGS. 15 and 16 may be executed or performed in any order or sequence not limited to the order and sequence shown and described in the figures. Also, some of the above steps of the flow diagrams of FIGS. 15 and 16 may be executed or performed substantially simultaneously where appropriate or in parallel to reduce latency and processing times.

The above-described embodiments of the present disclosure are presented for purposes of illustration and not of limitation, and the present disclosure is limited only by the claims which follow.

What is claimed is:

1. A system for adjusting presenting audio output based on eye tracking input, the system comprising:
   a memory storing data defining a boundary based on a coordinate system, the boundary corresponding to a first display element of displayed content;
   an input configured to receive data indicating coordinates of a gaze point location of a user viewing the displayed content; and
   a processor configured to:
   compare the received coordinates of the gaze point location to the boundary corresponding to the first display element to determine whether the gaze point location is inside the boundary corresponding to the first display element; and
   in response to determining that the gaze point location is outside the boundary corresponding to the first display element, present audio corresponding to a second display element of the displayed content more prominently than audio of the first display element such that the audio corresponding to the first display element is at a volume level that is lower than a volume level of the audio corresponding to the second display element.

2. The system of claim 1, wherein the processor is further configured to:
- select a first audio track associated with the second display element from a plurality of audio tracks associated with the displayed content in response to determining that the gaze point location is outside the boundary corresponding to the first display element; and
- present the selected first audio track instead of a second of the plurality of audio tracks that is associated with the first display element.

3. The system of claim 2, wherein the processor is further configured to:
- adjust at least one additional audio track associated with the displayed content.

4. The system of claim 1, wherein the processor is further configured to:
- select an audio track to accompany the content from a plurality of audio tracks associated with the displayed content.

5. The system of claim 1, the system further comprising an eye tracker configured to:
- determine a gaze point of a user;
- determine coordinates of a location on the display that the gaze point corresponds to; and
- transmit data indicating the coordinates of the gaze point location on the display to the input.

6. The system of claim 1, wherein the processor is further configured to simultaneously adjust an image of the displayed content in response to determining that the gaze point location is outside the boundary corresponding to the first display element.

7. The system of claim 1, wherein the processor is further configured to:
- bringing the second display element into focus; and
- bringing at least one other display element out of focus.

8. The system of claim 1, wherein the processor is further configured to display closed captioning in response to determining that the gaze point location is outside the boundary corresponding to the first display element.

9. The system of claim 1, wherein the processor is further configured to adjust the audio setting associated with the displayed content based on a duration of the user's gaze on the first display element.

10. A method for adjusting audio output based on eye tracking input, the method comprising:
- storing data defining a boundary based on a coordinate system, the boundary corresponding to a first display element of displayed content;
- receiving data indicating coordinates of a gaze point location of a user viewing the displayed content;
- comparing, using control circuitry, the received coordinates of the gaze point location to the boundary corresponding to the first display element to determine whether the gaze point location is inside the boundary corresponding to the first display element; and
- in response to determining that the gaze point location is outside inside the boundary corresponding to the first display element, presenting adjusting, using control circuitry, an audio corresponding to a second display element of the displayed content more prominently than audio of the first display element such that the audio corresponding to the first display element is at a volume level that is lower than a volume level of the audio corresponding to the second display element.

11. The method of claim 10, wherein adjusting the audio setting of the displayed content comprises:
- selecting a first audio track associated with the second display element from a plurality of audio tracks associated with the displayed content in response to determining that the gaze point location is outside the boundary corresponding to the first display element; and
- presenting the selected first audio track instead of a second of the plurality of audio tracks that is associated with the first display element.

12. The method of claim 11, further comprising:
- adjusting at least one additional audio track associated with the displayed content.

13. The method of claim 10, wherein adjusting the audio setting of the displayed content comprises:
- selecting an audio track to accompany the displayed content from a plurality of audio tracks associated with the displayed content.

14. The method of claim 10, further comprising:
- determining a gaze point of a user;
- determining coordinates of a location on the display that the gaze point corresponds to; and
- transmitting data indicating the coordinates of the gaze point location on the display to the input.

15. The method of claim 10, further comprising:
- simultaneously adjusting an image of the displayed content in response to determining that the gaze point location is outside the boundary corresponding to the first display element.

16. The method of claim 10, wherein adjusting the image comprises:
- bringing the second display element into focus; and
- bringing at least one other display element out of focus.

17. The method of claim 10, further comprising:
- displaying closed captioning in response to determining that the gaze point location is outside the boundary corresponding to the first display element.

18. The method of claim 10, further comprising:
- adjusting the audio setting associated with the content based on a duration of the user's gaze on the first display element.

* * * * *

UNITED STATES PATENT AND TRADEMARK OFFICE
CERTIFICATE OF CORRECTION

| | | |
|---|---|---|
| PATENT NO. | : 8,854,447 B2 | Page 1 of 1 |
| APPLICATION NO. | : 13/723608 | |
| DATED | : October 7, 2014 | |
| INVENTOR(S) | : Conness et al. | |

It is certified that error appears in the above-identified patent and that said Letters Patent is hereby corrected as shown below:

On the Title page of the patent:

In item 72, line 7 (Inventors), please change "Bullwinke" to --Bullwinkle--

Signed and Sealed this
Sixth Day of January, 2015

Michelle K. Lee
*Deputy Director of the United States Patent and Trademark Office*